(12) United States Patent
Fu

(10) Patent No.: US 12,441,448 B1
(45) Date of Patent: Oct. 14, 2025

(54) PROPELLER MOTHER AND CHILD TRANSMISSION ASSEMBLY WITH DUAL PROTECTION

(71) Applicant: Zhidong Fu, Qingdao (CN)

(72) Inventor: Zhidong Fu, Qingdao (CN)

( * ) Notice: Subject to any disclaimer, the term of this patent is extended or adjusted under 35 U.S.C. 154(b) by 0 days.

(21) Appl. No.: 19/037,077

(22) Filed: Jan. 25, 2025

(30) Foreign Application Priority Data

Jan. 23, 2025 (CN) .......................... 202510104747.X

(51) Int. Cl.
*B63H 1/20* (2006.01)
*B63H 23/34* (2006.01)

(52) U.S. Cl.
CPC ......... *B63H 1/20* (2013.01); *B63H 2023/342* (2013.01)

(58) Field of Classification Search
CPC ............................ B63H 1/20; B63H 2023/342
See application file for complete search history.

(56) References Cited

U.S. PATENT DOCUMENTS 5,575,698 A * 11/1996 Ogino .................... B63H 23/30
416/129
7,086,836 B1 * 8/2006 Sheth .................... B63H 23/34
416/170 R

* cited by examiner

*Primary Examiner* — Sabbir Hasan
(74) *Attorney, Agent, or Firm* — Birchwood IP

(57) ABSTRACT

A propeller mother and child transmission assembly with dual protection is provided, which includes a child transmission shaft sleeve and a mother transmission shaft sleeve. An outer peripheral surface of the child transmission shaft sleeve is fixedly provided with a plurality of first transmission protrusions and a plurality of second transmission protrusions, each of the first transmission protrusions and each of the second transmission protrusions are arranged alternately; the mother transmission shaft sleeve is provided with a plurality of first transmission recesses and a plurality of second transmission recesses, each of the first transmission recesses and each of the second transmission recesses are arranged alternately. Each first transmission protrusion is threaded through each first transmission recess, and each second transmission protrusion is threaded through each second transmission recess. The present application has an effect of preventing the transmission assembly from easily losing its transmission capability.

10 Claims, 9 Drawing Sheets

PROPELLER MOTHER AND CHILD TRANSMISSION ASSEMBLY WITH DUAL PROTECTION

CROSS-REFERENCE TO RELATED APPLICATIONS

This application claims priority to Chinese Patent Application No. 202510104747.X, filed on Jan. 23, 2025, which is hereby incorporated by reference in its entirety.

TECHNICAL FIELD

The present disclosure relates to the field of propeller technologies, and in particular, to a propeller mother and child transmission assembly with dual protection.

BACKGROUND

Propeller is currently the most widely used form of propulsion on various types of ships, which can convert about 70% of mechanical power into propulsion force. It has the advantages of simple construction, low cost, convenient use, and high efficiency. Referring to FIGS. 1, 2, and 3, marine propellers mainly include a propeller hub, multiple propeller blades fixed to the propeller hub, and a transmission component located inside the propeller hub. When working, a drive shaft of a driving motor transmits power to the transmission component, which drives the propeller hub to rotate. The rotation of the propeller hub can generate continuous propulsion power through the propeller blades.

The transmission components between the drive shaft and the propeller shaft in the existing technology generally include a child transmission shaft sleeve and a mother transmission shaft sleeve. The child transmission shaft sleeve is fixed coaxially with the drive shaft, and the mother transmission shaft sleeve is fixed and coaxial with the propeller shaft. An outer peripheral surface of the child transmission shaft sleeve is fixedly connected with four transmission protrusions, and an inner peripheral surface of the mother transmission shaft sleeve is provided with four transmission recesses. Each transmission protrusion is respectively inserted into each transmission recess. When the drive shaft is rotated, the child transmission shaft sleeve drives the mother transmission shaft sleeve to rotate through a contact between each transmission protrusion and each transmission recess, and a rotation of the mother transmission shaft sleeve drives the propeller hub to rotate, thereby completing a transmission of power.

Regarding the relevant technologies mentioned above, when the propeller blades are subjected to external force impact or overloaded operation, it is easy to cause an excessive contact stress between the transmission protrusions and transmission recesses, which can lead to damage to the structure of the transmission protrusions or transmission recesses, and ultimately cause the transmission component to lose transmission capacity, rendering it difficult for the propeller to work properly.

SUMMARY

In order to prevent the transmission component from losing its transmission capability when the propeller is impacted or overloaded, the present application provides a propeller mother and child transmission assembly with dual protection.

The present application provides a propeller mother and child transmission assembly with dual protection, which adopts the following technical solution: a propeller mother and child transmission assembly with dual protection, including a child transmission shaft sleeve and a mother transmission shaft sleeve, where an outer peripheral surface of the child transmission shaft sleeve is fixedly provided with a plurality of first transmission protrusions and a plurality of second transmission protrusions, each of the first transmission protrusions and each of the second transmission protrusions are alternately arranged;

the mother transmission shaft sleeve is provided with a plurality of first transmission recesses and a plurality of second transmission recesses, each of the first transmission recesses and each of the second transmission recesses are arranged alternately; when the child transmission shaft sleeve is rotatably provided in a middle position of the mother transmission shaft sleeve, each of the first transmission protrusions is threaded through each of the first transmission recesses, and each of the second transmission protrusions is threaded through each of the second transmission recesses;

when the child transmission shaft sleeve is rotated in any direction, each of the first transmission protrusions is rotated to an angle of A where it abuts against each of the first transmission recesses, each of the second transmission protrusions is rotated to an angle of B where it abuts against each of the second transmission recesses, and angle A is smaller than angle B.

By adopting the above technical solution, when the transmission component is driven, each of the first transmission protrusions is rotated to abut against each of the first transmission recesses, and then the child transmission shaft sleeve is rotated to drive each of the first transmission protrusions to rotate. Each of the first transmission protrusions drives the mother transmission shaft sleeve to rotate through each of the first transmission recesses, thus completing a transmission of power. At this time, each of the second transmission protrusions is not easily in contact with each of the second transmission recesses and is not easy to transmit.

When the propeller is subjected to external force impact or overload, a contact stress between each of the first transmission protrusions and each of the first transmission recesses is too high, which leads to deformation of each of the first transmission recesses, thereby increasing a deflection angle between the child transmission shaft sleeve and the mother transmission shaft sleeve. This causes each of the second transmission protrusions to contact each of the second transmission recesses, thereby allowing the power transmission of the transmission component to continue to be stably carried out through each of the second transmission protrusions. This improves a situation where when the propeller blade is subjected to external force impact or overloaded operation, it is easy to cause an excessive contact stress between the transmission protrusions and the transmission recesses, which can lead to damage to the transmission protrusions or transmission recesses structure, and ultimately cause the transmission component to lose its transmission capacity, resulting in the propeller losing its transmission ability and is difficult to work properly.

In some embodiments of the present application, when the child transmission shaft sleeve is rotated in any direction, a maximum rotation angle of A is 8-16 degrees, and a maximum rotation angle of B is 16-32 degrees.

In some embodiments of the present application, cross-sectional shapes of each of the first transmission protrusions and each of the second transmission protrusions include isosceles trapezoids, rectangles, and squares.

By adopting the above technical solution, a structural strength between each of the first transmission protrusions and each of the second transmission protrusions is improved, thereby improving the service life and usability of each of the first transmission protrusions and each of the second transmission protrusions.

In some embodiments of the present application, each of the first transmission protrusions includes two symmetrically distributed first side surfaces, and each of the second transmission protrusions includes two symmetrically distributed second side surfaces;

each of the first transmission recesses includes two symmetrically distributed first transmission surfaces, and each of the second transmission recesses includes two symmetrically distributed second transmission surfaces;

when each of the first transmission protrusions is rotated to abut against each of the first transmission recesses, the first transmission surfaces on the same side are respectively in contact with the second transmission surfaces on the same side; when each of the second transmission protrusions is rotated to abut against each of the second transmission recesses, the second transmission surfaces on the same side are respectively in contact with the second transmission surfaces on the same side.

By adopting the above technical solution, when the transmission component is driven, the first transmission surface and the first side surface are in contact for transmission, or the second transmission surface and the second side surface are in contact for transmission, thereby rendering the contact area of the transmission larger and more stable. This increases the torque borne by each of the first transmission recesses during transmission of the transmission component, resulting in better transmission stability and usability of the transmission component.

In some embodiments of the present application, each of the first transmission protrusions and each of the second transmission protrusions has the same shape and structure; a distance between each of the first transmission protrusions and adjacent two second transmission protrusions is the same.

In some embodiments of the present application, there are 2 to 6 first transmission protrusions, and there are 2 to 6 second transmission protrusions.

In some embodiments of the present application, a rubber sleeve is wrapped around an outer peripheral surface of the child transmission shaft sleeve, and the rubber sleeve wraps around each of the first transmission protrusions and each of the second transmission protrusions.

By adopting the above technical solution and setting the rubber sleeve, the connection between the child transmission shaft sleeve and the mother transmission shaft sleeve is transformed from a hard connection to a soft connection, so that the vibration transmitted during the transmission of the transmission components is absorbed and buffered by the rubber sleeve, thereby reducing a noise generated by the ship during idle and navigation, which is more conducive to protecting marine life and rendering environmental protection better.

In some embodiments of the present application, the mother transmission shaft sleeve includes a plurality of third transmission surfaces; when the child transmission shaft sleeve is rotatably provided in a middle position of the mother transmission shaft sleeve, each of the third transmission surfaces abuts against an outer peripheral surface of the rubber sleeve; a radius diameter of each of the third transmission surfaces is the same as a diameter of the rubber sleeve.

In some embodiments of the present application, the mother transmission shaft sleeve is made of a material with a honeycomb structure.

By adopting the above technical solution, the contact stress between each of the first transmission protrusions and each of the first transmission recesses is too high. When a groove body of each of the first transmission recesses deforms, the mother transmission shaft sleeve undergoes irreversible concave deformation, rendering it less likely for the first transmission recesses with destructive deformation to affect the continued power transmission of the transmission component, resulting in better usability.

In some embodiments of the present application, an inner peripheral surface of the child transmission shaft sleeve is fixedly provided with a plurality of driving protrusions, each of the driving protrusions is uniformly distributed around a circumference of the child transmission shaft sleeve.

In summary, this application includes at least one beneficial technical effect as follows: when the transmission component is driven, each of the first transmission protrusions is rotated to abut against each of the first transmission recesses, and then the child transmission shaft sleeve is rotated to drive each of the first transmission protrusions to rotate. Each of the first transmission protrusions drives the mother transmission shaft sleeve to rotate through each of the first transmission recesses, thus completing the transmission of power. At this time, each of the second transmission protrusions is not easy to abut against and transmit with each of the second transmission recesses.

When the propeller is impacted or overloaded by external forces, the contact stress between each of the first transmission protrusions and each of the first transmission recesses is too high, which leads to deformation of each of the first transmission recesses. This increases the deflection angle between the child transmission shaft sleeve and the mother transmission shaft sleeve, causing each of the second transmission protrusions to abut against each of the second transmission recesses, thereby allowing the power transmission of the transmission component to continue stably through each of the second transmission protrusion.

Numeral reference: 1—child transmission shaft sleeve; 11—connection hole; 111—driving protrusion; 12—first shaft body; 121—connecting protrusion; 13—second shaft body; 131—first transmission protrusion; 1311—first side surface; 132—second transmission protrusion; 1321—second side surface; 2—mother transmission shaft sleeve; 21—connection surface; 22—transmission hole; 221—first transmission recess; 2211—second transmission surface; 222—second transmission recess; 2221—second transmission surface; 223—third transmission surface; 3—rubber sleeve; 10—transmission component; 20—propeller; 201—propeller hub; 202—propeller blade.

DESCRIPTION OF EMBODIMENTS

Further detailed explanation of the present application will be provided in combination with FIGS. 4-9.

Figure 1:
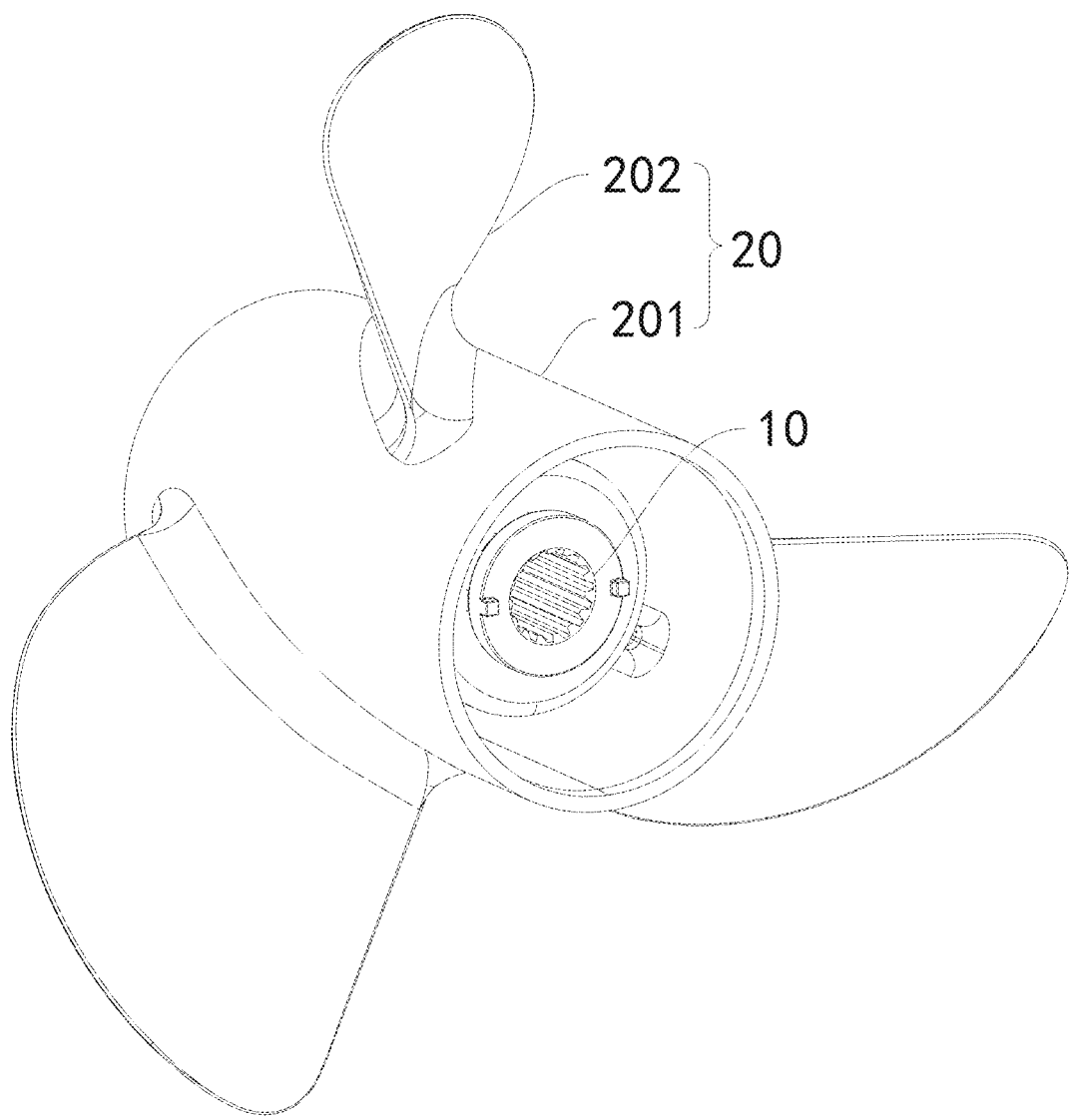
FIG. 1 is a first schematic diagram of an overall structure of a propeller.
Figure 2:
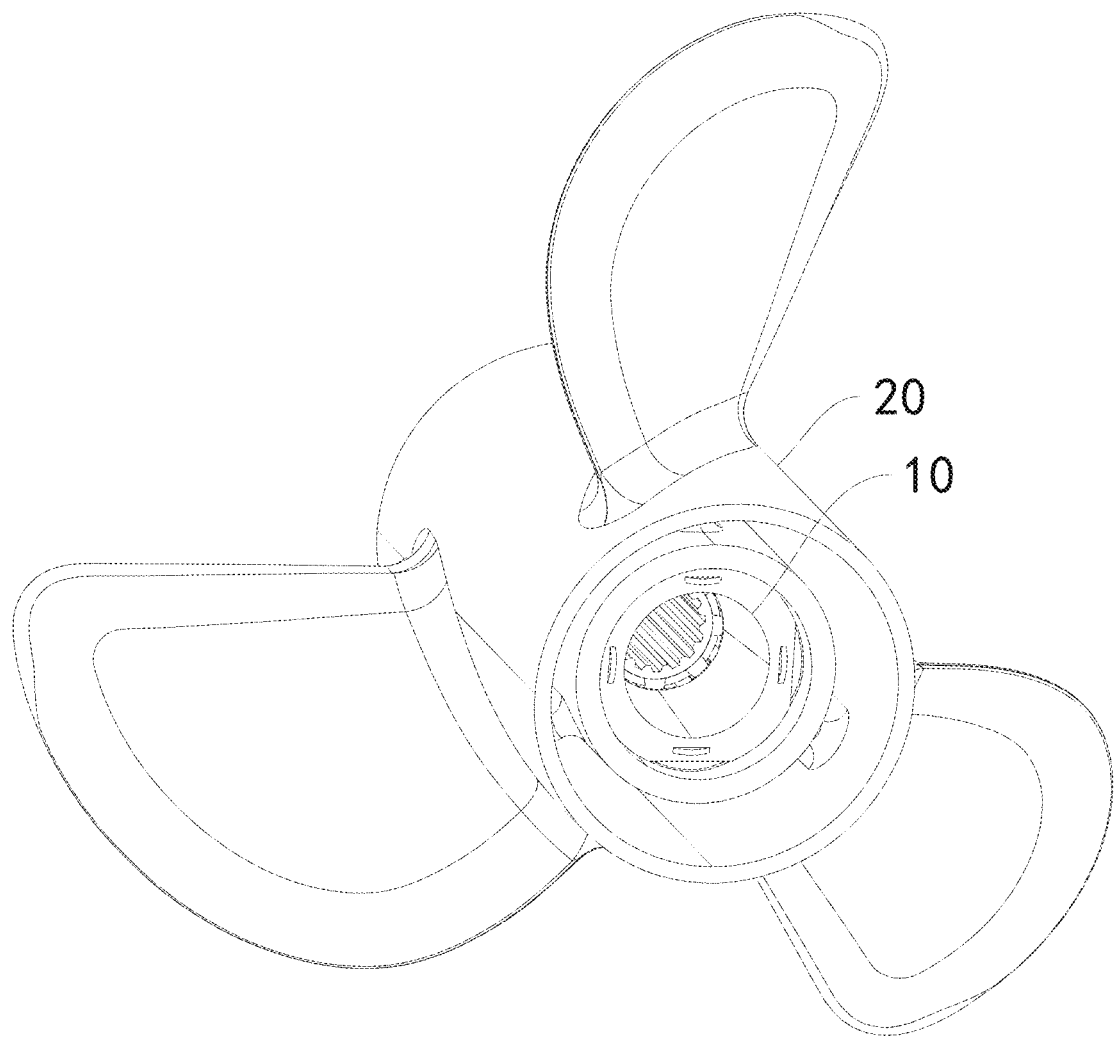
FIG. 2 is a second schematic diagram of the overall structure of the propeller.
Figure 3:
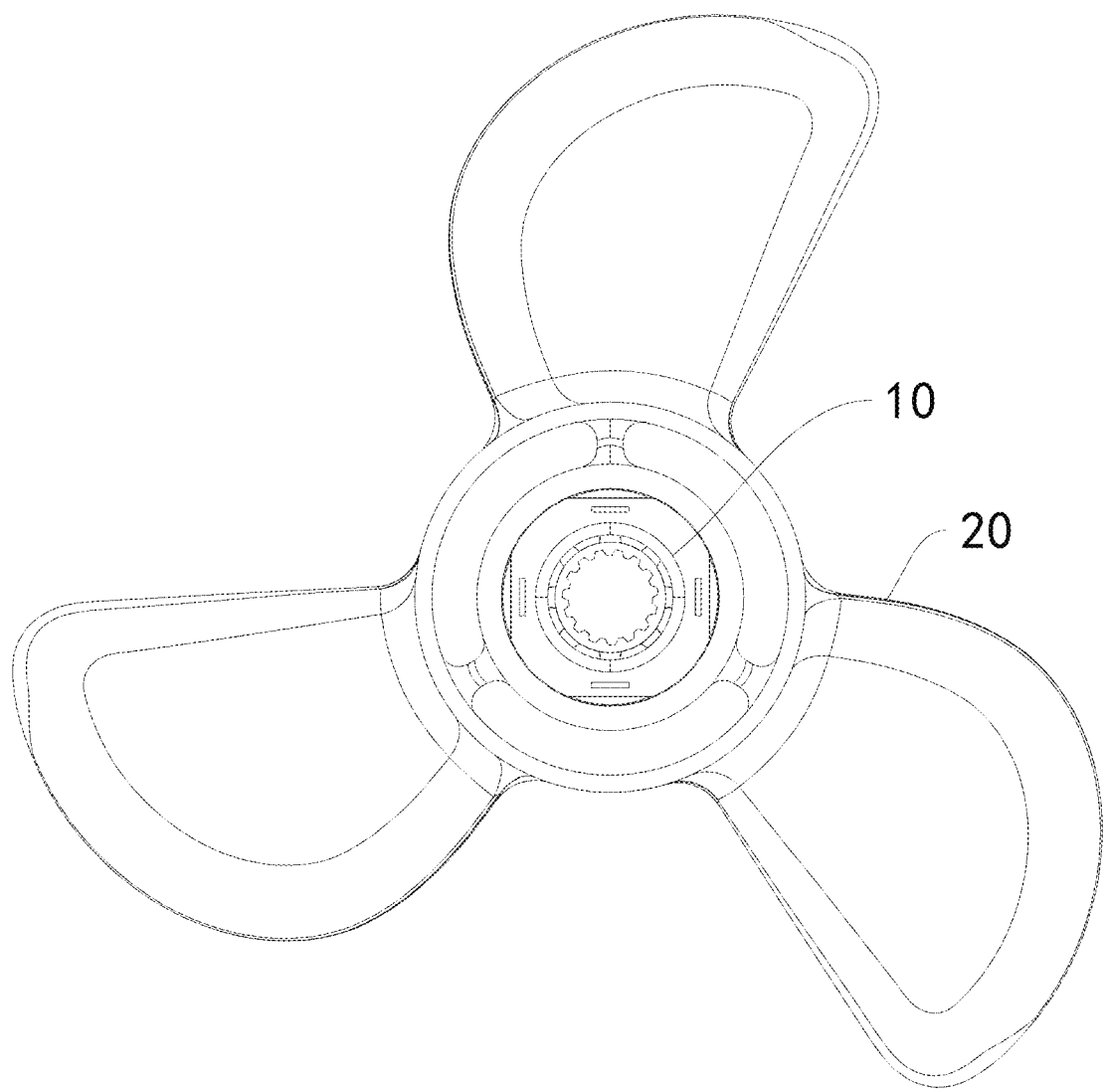
FIG. 3 is a third schematic diagram of the overall structure of the propeller.
Figure 4:
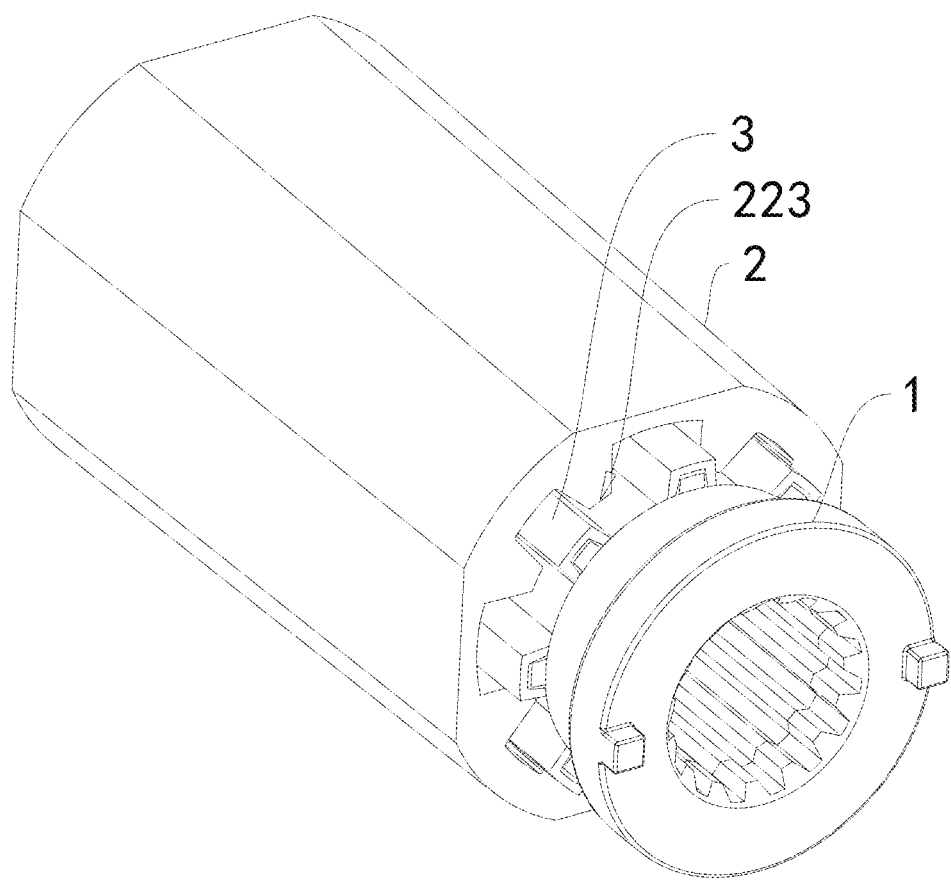
FIG. 4 is a schematic diagram of an overall structure of an embodiment of the present application.

An embodiment of the present application discloses a propeller mother and child transmission assembly with dual protection. Referring to FIG. 4, the propeller mother and child transmission assembly with dual protection includes a child transmission shaft sleeve 1 and a mother transmission shaft sleeve 2.

Figure 5:
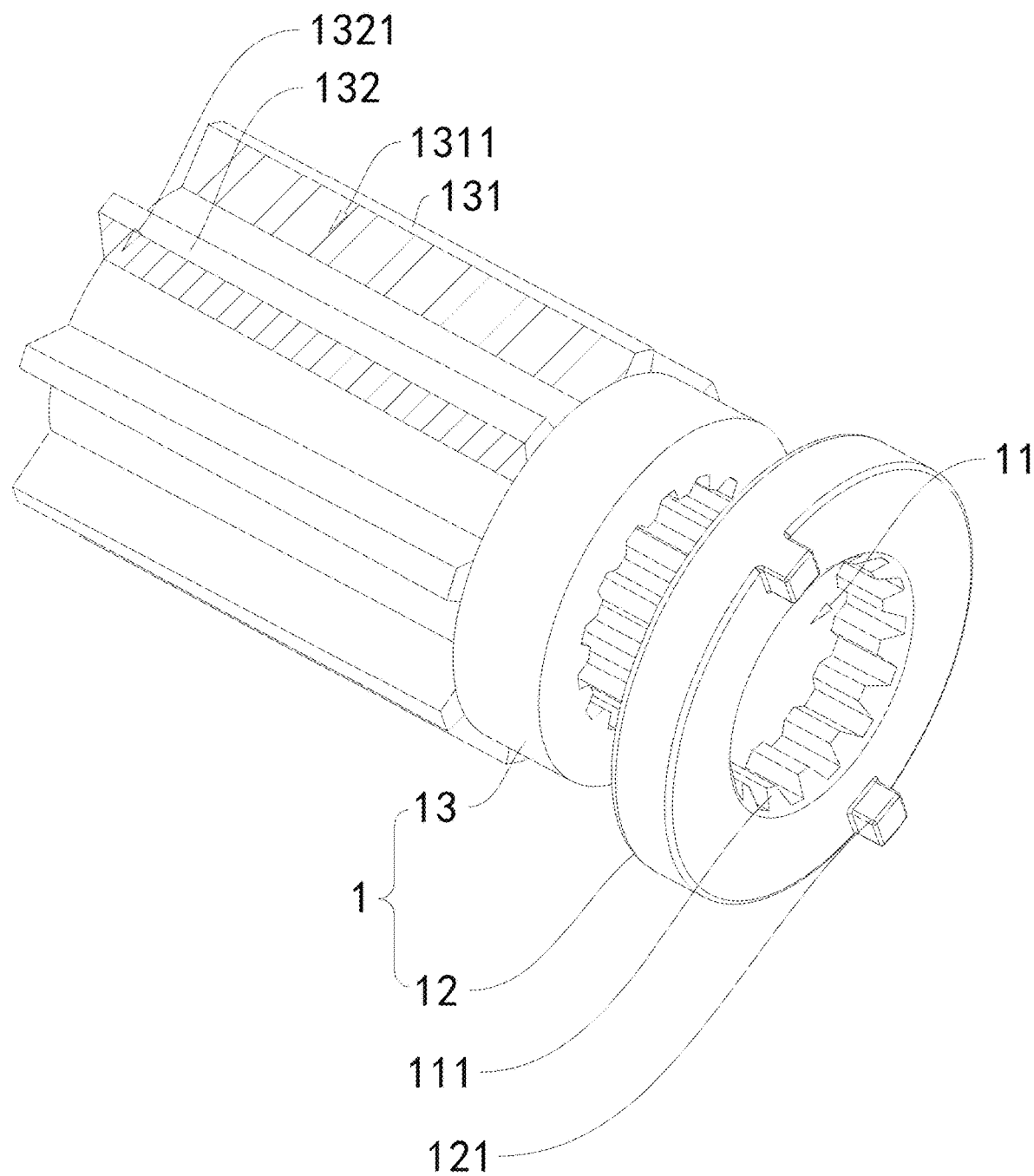
FIG. 5 is a first schematic structural diagram of a child transmission shaft sleeve in an embodiment of the present application.
Figure 6:
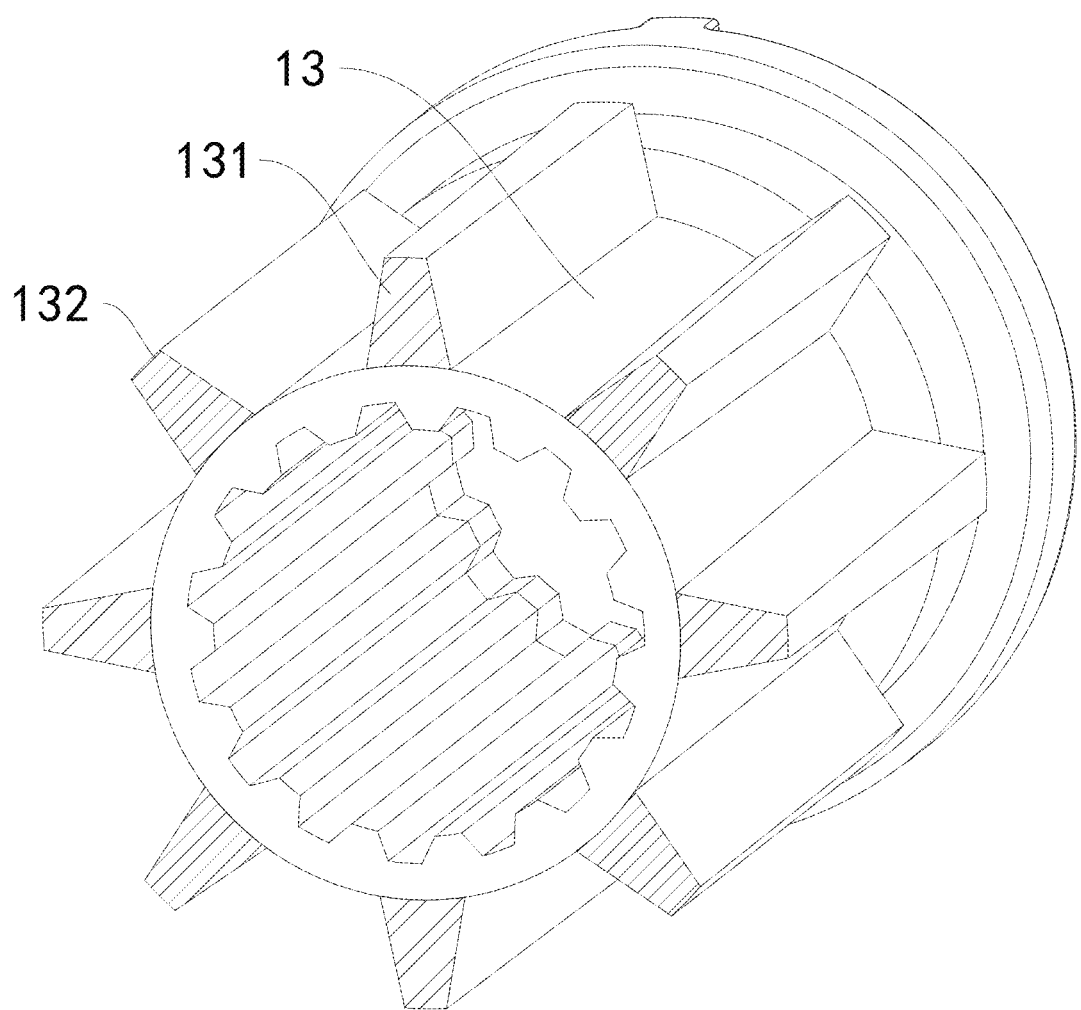
FIG. 6 is a second schematic structural diagram of the child transmission shaft sleeve in the embodiment of the present application.

Referring to FIGS. 5 and 6, the child transmission shaft sleeve 1 is a cylindrical shape. A connection hole 11 is provided in a middle of the child transmission shaft sleeve 1, which is used to connect with a driving shaft of a driving motor. A plurality of driving protrusions 111 are fixedly arranged on an inner circumferential surface of the connection hole 11. Each of the driving protrusions 111 is evenly distributed around a circumference of the child transmission shaft sleeve 1, rendering a connection between the child transmission shaft sleeve 1 and the driving shaft of the driving motor tighter and more stable. The child transmission shaft sleeve 1 includes a first shaft body 12 and a second shaft body 13. The second shaft body 13 is fixedly connected to one end of the first shaft body 12, and a diameter of the first shaft body 12 is larger than that of the second shaft body 13. A height of the first shaft body 12 is smaller than a height of the second shaft body 13; and two connecting protrusions 121 are fixedly provided on one side of the first shaft body 12 away from the second shaft body 13. The two connecting protrusions 121 are evenly distributed around an axis of the first shaft body 12 in a circumferential direction.

Referring to FIGS. 5 and 6, an outer surface of the second shaft body 13 is fixedly provided with four first transmission protrusions 131 and four second transmission protrusions 132. Each of the first transmission protrusions 131 is evenly distributed around an axis of the child transmission shaft sleeve 1 in a circumferential direction, and each of the second transmission protrusions 132 is evenly distributed around an axis of the child transmission shaft sleeve 1 in a circumferential direction. Each of the first transmission protrusions 131 and each of the second transmission protrusions 132 are staggered, and the shape and structure of each of the first transmission protrusions 131 and each of the second transmission protrusions 132 are the same; a distance between each of the first transmission protrusions 131 and adjacent two second transmission protrusions 132 is the same. In this embodiment of the present application, cross sections of each of the first transmission protrusions 131 and each of the second transmission protrusions 132 are the same, and they are isosceles trapezoids.

During assembly, the second shaft body 13 is first assembled onto the propeller, and then the first shaft body 12 is fixedly connected to one end of the second shaft body 13, thus completing the assembly of the child transmission shaft sleeve 1.

Figure 7:
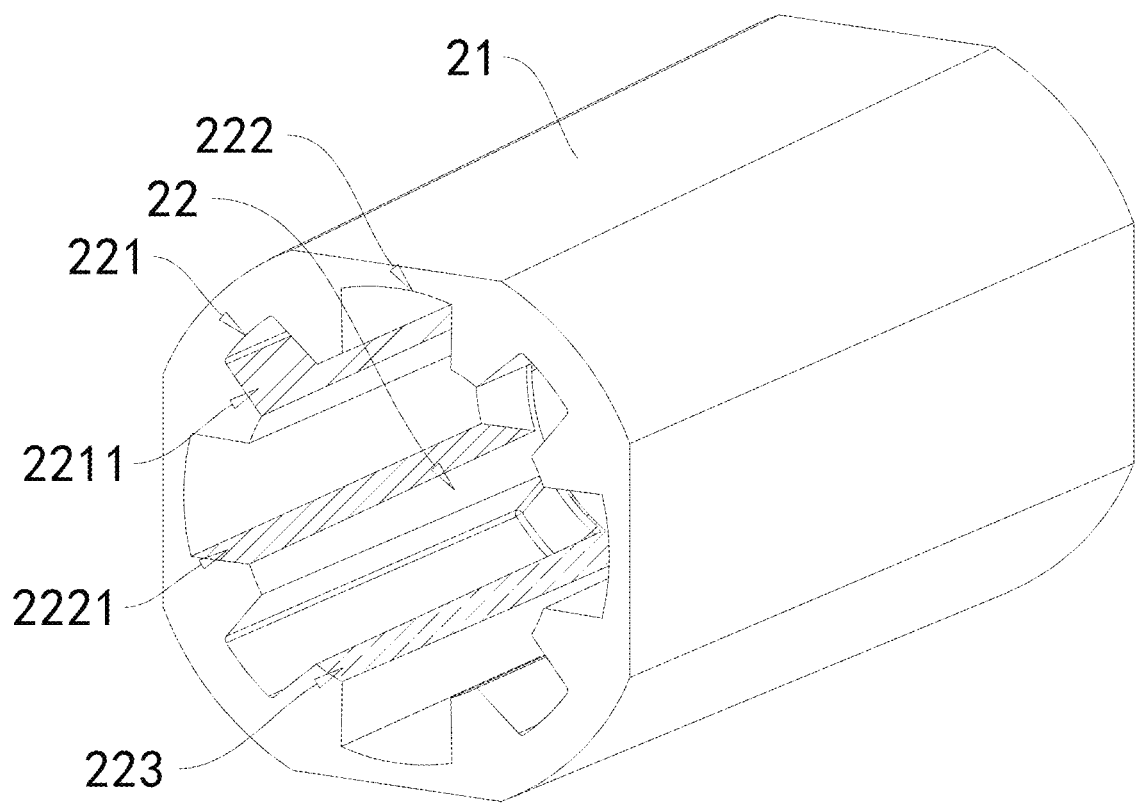
FIG. 7 is a schematic structural diagram of a mother transmission shaft sleeve in an embodiment of the present application.

Referring to FIG. 7, the mother transmission shaft sleeve 2 is cylindrical in shape, and an outer peripheral surface of the mother transmission shaft sleeve 2 includes four connection surfaces 21. When the mother transmission shaft sleeve 2 is fixed to the propeller, each of the connection surfaces 21 is in contact with the propeller, so that a relative rotation between the mother transmission shaft sleeve 2 and the propeller hub 201 is less likely to occur. A transmission hole 22 is provided in a middle position of the mother transmission shaft sleeve 2, and the child transmission shaft sleeve 1 is inserted and rotatably provided in the transmission hole 22.

Figure 8:
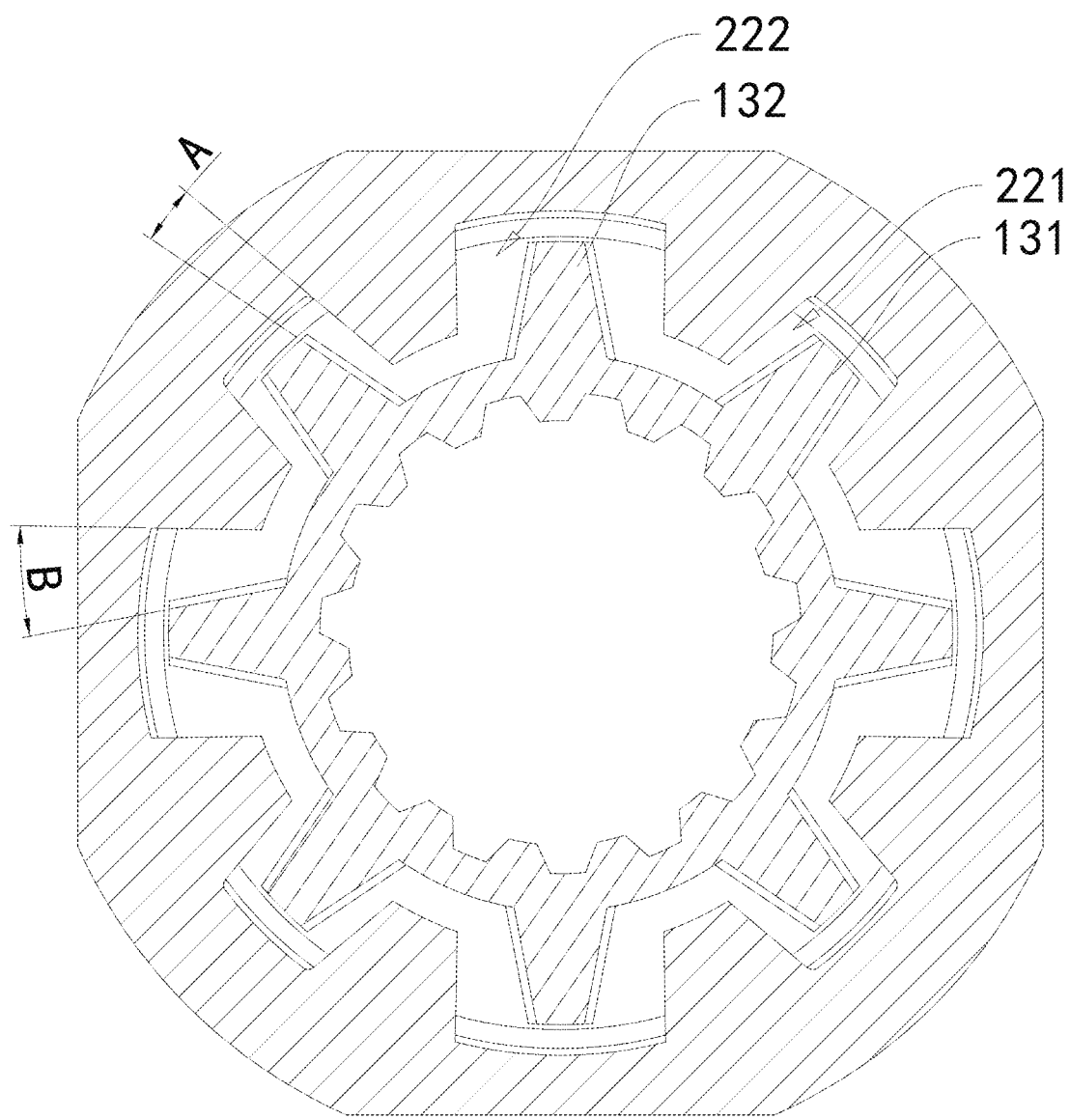
FIG. 8 is a cross-sectional view of a transmission component in an embodiment of the present application.

Referring to FIGS. 7 and 8, the transmission hole 22 is provided with four first transmission recesses 221 and four second transmission recesses 222. Each of the first transmission recesses 221 is evenly distributed around an axis of the mother transmission shaft sleeve 2 in a circumference direction, and each of the second transmission recesses 222 is evenly distributed around an axis of the mother transmission shaft sleeve 2 in a circumference direction. The first transmission recesses 221 and each of the second transmission recesses 222 are arranged alternately. When the child transmission shaft sleeve 1 is rotatably provided in a middle position of the mother transmission shaft sleeve 2, each of the first transmission protrusions 131 is respectively inserted into each of the first transmission recesses 221, and each of the second transmission protrusions 132 is respectively inserted into each of the second transmission recesses 222.

Referring to FIG. 8, when the child transmission shaft sleeve 1 is rotated in any direction, each of the first transmission protrusions 131 is rotated to an angle A where it abut against with each of the first transmission recesses 221, and each of the second transmission protrusions 132 is rotated to an angle B where it abuts against each of the second transmission recesses 222. The angle of A is smaller than the angle of B. In this embodiment of the present application, when the child transmission shaft sleeve 1 is rotated in any direction, a maximum rotation angle of A is 12 degrees, that is, an average buffering rotation angle of A is 6 degrees, and a maximum rotation angle of B is 24 degrees, that is, an average buffering rotation angle of B is 12 degrees.

Referring to FIGS. 5 and 7, each of the first transmission protrusions 131 includes two symmetrically distributed first side surfaces 1311, each of the second transmission protrusions 132 includes two symmetrically distributed second side surfaces 1321, each of the first transmission recesses 221 includes two symmetrically distributed second transmission surfaces 2211, and each of the second transmission recesses 222 includes two symmetrically distributed second transmission surfaces 2221. When each of the first transmission protrusions 131 is rotated to abut against each of the first transmission recesses 221, each of the second transmission surfaces 2211 on the same side is in contact with each of the second transmission surfaces 2221 on the same side, and each of the second transmission protrusions 132 is rotated to abut against each of the second transmission recesses 222. Each of the second transmission surfaces 2221 on the same side is in contact with each of the second transmission surfaces 2221 on the same side.

Referring to FIGS. 5 and 7, when the transmission component 10 is driven, the second transmission surface 2211 and the first side surfaces 1311 are in contact for transmission, or the second transmission surfaces 2221 and the second side surface 1321 are in contact for transmission, resulting in a larger and more stable contact area for transmission. This increases a torque borne by each of the first transmission recesses 221 during transmission of the transmission component 10, resulting in better transmission stability of the transmission component 10.

Figure 9:
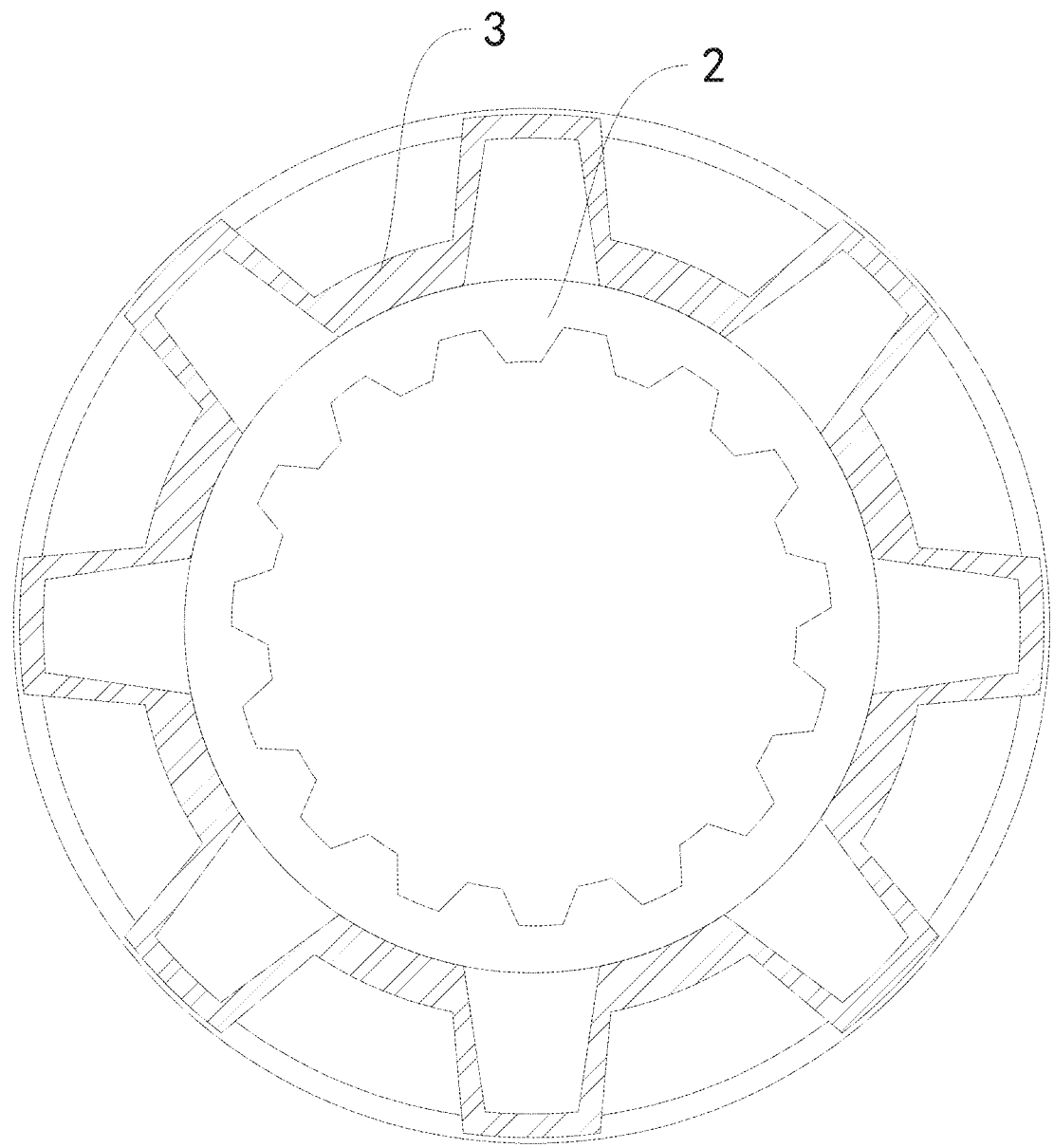
FIG. 9 is a schematic diagram of a rubber sleeve wrapping in an embodiment of the present application.

Referring to FIGS. 4 and 9, a rubber sleeve 3 is wrapped around an outer circumference of the child transmission shaft sleeve 1, and the rubber sleeve 3 wraps around each of the first transmission protrusions 131 and each of the second transmission protrusions 132, thereby transforming a connection between the child transmission shaft sleeve 1 and the mother transmission shaft sleeve 2 from a hard connection to a soft connection. This allows the vibration transmitted during transmission of the transmission component 10 to be absorbed and buffered by the rubber sleeve 3, thereby reducing a noise generated by the ship during idle and navigation, and better protecting marine life.

Referring to FIGS. 4 and 9, the mother transmission shaft sleeve 2 includes a plurality of third transmission surfaces 223. When the child transmission shaft sleeve 1 is rotatably provided in a middle position of the mother transmission shaft sleeve 2, each of the third transmission surfaces 223 abuts against an outer circumferential surface of the rubber sleeve 3. A radius diameter of each of the third transmission surfaces 223 is the same as a diameter of the rubber sleeve 3, thereby ensuring a coaxially between the mother transmission shaft sleeve 2 and the child transmission shaft sleeve 1, thereby improving the transmission stability between the child transmission shaft sleeve 1 and the mother transmission shaft sleeve 2.

The material used for the mother transmission shaft sleeve 2 in this embodiment is a composite nylon material made of nylon and glass fiber. The composite nylon is composed of nylon and glass fiber, and addition ratio of different glass fiber (such as 10%, 20%, 30%, 40%, 50%) in the composite nylon significantly affects the strength, rigidity, and toughness of the material, rendering it suitable for different application needs.

Characteristics of incorporating 10% glass fiber: slightly improves the strength and rigidity of the material, improves heat resistance.

Characteristics of incorporating 20% glass fiber: significantly improves tensile strength and rigidity, and increases dimensional stability.

Characteristics of incorporating 30% glass fiber: significantly improves material strength and rigidity while maintaining good toughness and impact performance.

Characteristics of incorporating 40% fiberglass: having extremely high strength and rigidity, significantly reducing material shrinkage.

Characteristics of incorporating 50% fiberglass: maximizes strength, but may sacrifice some toughness and increase brittleness.

The composite nylon material used in the embodiments of this application incorporates 30% glass fiber, resulting in excessive contact stress between each of the first transmission protrusions 131 and each of the first transmission recesses 221. When a groove body of each of the first transmission recesses 221 deforms, the mother transmission shaft sleeve 2 undergoes irreversible concave deformation, rendering it difficult for each of the first transmission recesses 221 with destructive deformation to affect a continued power transmission of the transmission component 10.

The implementation principle of a propeller mother and child transmission component with dual protection in this application is as follows: when the transmission component 10 is driven, each of the first transmission protrusions 131 is rotated to abut against each of the first transmission recesses 221, and then the child transmission shaft sleeve 1 is rotated to drive each of the first transmission protrusions 131 to rotate. Each of the first transmission protrusions 131 drives the mother transmission shaft sleeve 2 to rotate through each of the first transmission recesses 221, thereby completing the transmission of power. At this time, each of the second transmission protrusions 132 is not easily in contact with each of the second transmission recesses 222, and the transmission is not easy.

When the propeller 20 is impacted or overloaded by external forces, the contact stress between each of the first transmission protrusions 131 and each of the first transmission recesses 221 is too high, which in turn causes deformation of each of the first transmission recesses 221, resulting in an increase in a deflection angle between the child transmission shaft sleeve 1 and the mother transmission shaft sleeve 2. This in turn causes each of the second transmission protrusions 132 to abut against each of the second transmission recesses 222, allowing the power transmission of the transmission component 10 to continue stably through each of the second transmission protrusions 132. This improves the situation where when the propeller blade 202 is impacted or overloaded by external forces, it is easy to cause excessive contact stress between the transmission protrusions and the transmission recesses, which in turn can lead to damage to the structure of the transmission protrusions or transmission recesses, ultimately resulting in the transmission of the transmission component 10. The problem of components losing transmission capability, rendering it difficult for propeller 20 to function properly.

The above are the preferred embodiments of the present application and do not limit the protection scope of the present application. Therefore, any equivalent changes made according to the structure, shape, and principle of the present application should be included in the protection scope of the present application.

What is claimed is:

1. A propeller mother and child transmission assembly with dual protection, comprising a child transmission shaft sleeve and a mother transmission shaft sleeve,
   wherein an outer peripheral surface of the child transmission shaft sleeve is fixedly provided with a plurality of first transmission protrusions and a plurality of second transmission protrusions, each of the first transmission protrusions and each of the second transmission protrusions are alternately arranged;
   the mother transmission shaft sleeve is provided with a plurality of first transmission recesses and a plurality of second transmission recesses, each of the first transmission recesses and each of the second transmission recesses are arranged alternately;
   when the child transmission shaft sleeve is rotatably provided in a middle position of the mother transmission shaft sleeve, each of the first transmission protrusions is threaded through each of the first transmission recesses, and each of the second transmission protrusions is threaded through each of the second transmission recesses;
   when the child transmission shaft sleeve is rotated in any direction, each of the first transmission protrusions is rotated to an angle A where it abuts against each of the first transmission recesses, each of the second transmission protrusions is rotated to an angle B where it abuts against each of the second transmission recesses, and the angle A is smaller than the angle B.

2. The propeller mother and child transmission assembly with dual protection according to claim 1, wherein when the child transmission shaft sleeve is rotated in any direction, a maximum rotation angle A is 8-16 degrees, and a maximum rotation angle B is 16-32 degrees.

3. The propeller mother and child transmission assembly with dual protection according to claim 1, wherein cross-sectional shapes of each of the first transmission protrusions and each of the second transmission protrusions comprises an isosceles trapezoid, rectangle, or square.

4. The propeller mother and child transmission assembly with dual protection according to claim 3, wherein each of the first transmission protrusions comprises two symmetrically distributed first side surfaces, and each of the second transmission protrusions comprises two symmetrically distributed second side surfaces;
- each of the first transmission recesses comprises two symmetrically distributed first transmission surfaces, and each of the second transmission recesses comprises two symmetrically distributed second transmission surfaces;
- when each of the first transmission protrusions is rotated to abut against each of the first transmission recesses, the first transmission surfaces on the same side are respectively in contact with the second transmission surfaces on the same side;
- when each of the second transmission protrusions is rotated to abut against each of the second transmission recesses, the second transmission surfaces on the same side are respectively in contact with the second transmission surfaces on the same side.

5. The propeller mother and child transmission assembly with dual protection according to claim 1, wherein each of the first transmission protrusions and each of the second transmission protrusions has the same shape and structure; a distance between each of the first transmission protrusions and adjacent two second transmission protrusions is the same.

6. The propeller mother and child transmission assembly with dual protection according to claim 1, wherein there are 2 to 6 first transmission protrusions, and there are 2 to 6 second transmission protrusions.

7. The propeller mother and child transmission assembly with dual protection according to claim 1, wherein a rubber sleeve is wrapped around an outer peripheral surface of the child transmission shaft sleeve, and the rubber sleeve wraps around each of the first transmission protrusions and each of the second transmission protrusions.

8. The propeller mother and child transmission assembly with dual protection according to claim 7, wherein the mother transmission shaft sleeve comprises a plurality of third transmission surfaces;
- when the child transmission shaft sleeve is rotatably provided in a middle position of the mother transmission shaft sleeve, each of the third transmission surfaces abuts against an outer peripheral surface of the rubber sleeve;
- a radius diameter of each of the third transmission surfaces is the same as a diameter of the rubber sleeve.

9. The propeller mother and child transmission assembly with dual protection according to claim 1, wherein the mother transmission shaft sleeve is made of a material with a honeycomb structure.

10. The propeller mother and child transmission assembly with dual protection according to claim 1, wherein an inner peripheral surface of the child transmission shaft sleeve is fixedly provided with a plurality of driving protrusions,
- each of the driving protrusions is uniformly distributed around a circumference of the child transmission shaft sleeve.

* * * * *